(12) United States Patent
MacGarry et al.

(10) Patent No.: US 11,777,869 B2
(45) Date of Patent: Oct. 3, 2023

(54) MESSAGE ARBITRATION IN A RING INTERCONNECT SYSTEM BASED ON ACTIVITY INDICATIONS FOR EACH NODE IN THE RING INTERCONNECT

(71) Applicant: Arm Limited, Cambridge (GB)

(72) Inventors: Fergus Wilson MacGarry, Cambridge (GB); Alex James Waugh, Cambridge (GB); Andrew John Turner, Cambridge (GB)

(73) Assignee: Arm Limited, Cambridge (GB)

( * ) Notice: Subject to any disclaimer, the term of this patent is extended or adjusted under 35 U.S.C. 154(b) by 435 days.

(21) Appl. No.: 16/170,366

(22) Filed: Oct. 25, 2018

(65) Prior Publication Data

US 2020/0136989 A1 Apr. 30, 2020

(51) Int. Cl.
| | |
|---|---|
| *H04B 10/275* | (2013.01) |
| *H04L 47/783* | (2022.01) |
| *H04L 41/0896* | (2022.01) |
| *H04L 47/30* | (2022.01) |
| *H04L 41/0806* | (2022.01) |
| *H04J 3/16* | (2006.01) |
| *H04J 3/08* | (2006.01) |

(Continued)

(52) U.S. Cl.
CPC ..... *H04L 47/783* (2013.01); *H04B 10/25755* (2013.01); *H04B 10/275* (2013.01); *H04J 3/085* (2013.01); *H04J 3/167* (2013.01); *H04L 12/437* (2013.01); *H04L 41/0806* (2013.01); *H04L 41/0896* (2013.01); *H04L 47/30* (2013.01); *H04L 49/102* (2013.01); *H04J 3/14* (2013.01); *H04L 47/13* (2013.01)

(58) Field of Classification Search
CPC ... H04J 3/14; H04J 3/167; H04J 3/085; H04B 10/25755; H04B 10/275; H04L 12/437; H04L 47/13; H04L 49/102
See application file for complete search history.

(56) References Cited

U.S. PATENT DOCUMENTS

| | | | |
|---|---|---|---|
| 2008/0049626 A1* | 2/2008 | Bugenhagen | ......... H04L 43/091 370/389 |
| 2009/0022168 A1* | 1/2009 | Sakauchi | ............ H04L 61/2596 370/406 |

(Continued)

*Primary Examiner* — Salvador E Rivas
(74) *Attorney, Agent, or Firm* — NIXON & VANDERHYE P.C.

(57) ABSTRACT

A ring interconnect system comprises a plurality of nodes. Each node is connected to two other nodes to form a ring interconnect. Every pair of nodes is connected by an inter-node path for that pair of nodes distinct from the ring interconnect. Each of the nodes comprises a message buffer to buffer messages received from at least one device associated with the node. Each of the nodes also comprises activity level circuitry to transmit an activity indication, when a number of the messages in the message buffer is equal to or above a threshold, to each other node of the plurality of nodes via the respective inter-node paths. Each of the nodes also comprises arbitrator circuitry to receive the activity indications from each other node and from the activity level circuitry, and to allow ingress of a message from the message buffer onto the ring interconnect in dependence on the activity indications. Also provided is a method of operating a node of a ring interconnect system.

20 Claims, 6 Drawing Sheets

(51) Int. Cl.
  *H04B 10/2575* (2013.01)
  *H04L 12/437* (2006.01)
  *H04L 49/102* (2022.01)
  H04J 3/14 (2006.01)
  H04L 47/10 (2022.01)

(56) References Cited

U.S. PATENT DOCUMENTS

2012/0170932 A1* 7/2012 Chu .................... H04J 14/0267
                                                          398/52
2014/0189298 A1* 7/2014 Morrison .............. G06F 1/3287
                                                          712/30
2018/0123717 A1* 5/2018 Luo .......................... H04L 12/42

* cited by examiner

MESSAGE ARBITRATION IN A RING INTERCONNECT SYSTEM BASED ON ACTIVITY INDICATIONS FOR EACH NODE IN THE RING INTERCONNECT

TECHNICAL FIELD

The present disclosure relates to a ring interconnect system and a method of operating a node of a ring interconnect.

DESCRIPTION

A ring interconnect system comprises a plurality of nodes, where each node is connected to only two other nodes. This results in a ring of connections, or channels, between the nodes, referred to as a ring interconnect. This is a space efficient architecture for systems with a large number of nodes as only one new connection is required for each additional node in the ring interconnect. Messages are then transmitted from each node in a single direction around the ring until they reach their respective target or destination node.

A key property to enable a free-flowing and efficient implementation of the ring interconnect is that messages already present on the ring interconnect take priority over messages entering the ring. This does mean, however, that if a particular node has a large number of messages to be transmitted, that particular node can indefinitely prevent messages from nodes downstream of it on the ring interconnect being transmitted on the ring interconnect. In other words, nodes of the ring interconnect can be starved and denied service on the ring interconnect.

SUMMARY

In one example embodiment described herein there is a ring interconnect system comprising: a plurality of nodes, each node connected to two other nodes to form a ring interconnect, wherein every pair of nodes is connected by an inter-node path for that pair of nodes distinct from the ring interconnect, each of the nodes comprising: a message buffer to buffer messages received from at least one device associated with the node; activity level circuitry to transmit an activity indication, to each other node of the plurality of nodes via the respective inter-node paths in dependence on message buffer occupancy; and arbitrator circuitry to receive the activity indications from each other node and from the activity level circuitry, and to allow ingress of a message from the message buffer onto the ring interconnect in dependence on the activity indications.

Also described herein there is method of operating a node of a ring interconnect comprising a plurality of nodes, each node connected to two other nodes to form the ring interconnect, the method comprising: buffering messages received from at least one device associated with the node; generating an activity indication, for transmission to each other node of the plurality of nodes in dependence on message buffer occupancy, wherein every pair of nodes is connected by an inter-node path for that pair of nodes separate from the ring interconnect, and the activity indication is transmitted along the respective inter-node paths; receiving the activity indications from each other node and the activity indication generated within the node; and allowing ingress of a buffered message onto the ring interconnect in dependence on the activity indications.

Also described herein there is a ring interconnect system comprising a plurality of nodes, each node connected to two other nodes to form a ring interconnect, wherein every pair of nodes is connected by an inter-node path for that pair of nodes distinct from the ring interconnect, each of the nodes comprising: means for buffering received messages from at least one device associated with the node; means for transmitting an activity indication, to each other node of the plurality of nodes along the respective inter-node paths in dependence on message buffer occupancy; means for receiving the activity indications from each other node and the activity indication from the means for transmitting, and means for allowing ingress of a message from the buffer onto the ring interconnect in dependence on the activity indications.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Before discussing the embodiments with reference to the accompanying figures, the following description of embodiments is provided.

In accordance with one example configuration there is provided a ring interconnect system comprising a plurality of nodes, each node connected to two other nodes to form a ring interconnect, wherein every pair of nodes is connected by an inter-node path for that pair of nodes distinct from the ring interconnect, each of the nodes comprising a message buffer to buffer messages received from at least one device associated with the node; activity level circuitry to transmit an activity indication, to each other node of the plurality of nodes via the respective inter-node paths in dependence on message buffer occupancy; and arbitrator circuitry to receive the activity indications from each other node and from the activity level circuitry, and to allow ingress of a message from the message buffer onto the ring interconnect in dependence on the activity indications. This allows priority for messages on the ring interconnect to be maintained whilst providing each node of the ring interconnect system with a fair allocation of the bandwidth of the ring interconnect. This is achieved by each node transmitting its intent to ingress a message into the ring interconnect by means of an activity indication. The activity indication is sent via dedicated inter-node paths which are separate from the ring interconnect so that the bandwidth of the ring interconnect is not unnecessarily taken up with activity indications, whilst also ensuring that activity indications can be successfully transmitted whenever the number of the messages in the message buffer is equal to or above the threshold. Each node of the ring interconnect system is then aware of the intent of each of the other nodes, allowing the nodes to work cooperatively to determine a fair allocation of the bandwidth of the ring interconnect for each node based on the intent of each node. Since each node is aware of the intent of each of the other nodes and therefore its allocation of the ring interconnect bandwidth, each node is able to determine when to ingress a message onto the ring interconnect without it being prevented from ingress. In other words, each node can anticipate when there will be an empty transmission cycle during which a message from that particular node can be ingressed onto the ring interconnect.

In some example configurations the arbitrator circuitry comprises a node pendency counter responsive to the activity indication from the activity level circuitry to increase a value held by the node pendency counter, wherein the arbitrator circuitry is responsive to the value held by the node pendency counter being equal to or above a predetermined value to allow ingress of the message from the message buffer onto the ring interconnect. In other words, the message is held in the message buffer until the value held by the node pendency counter increases to, or increases above, the predetermined amount. This adjusts the rate at which the messages from the node are ingressed onto the ring interconnect and means that the arbitrator circuitry can control when a message is ingressed onto the ring interconnect.

In some example configurations the node pendency counter is responsive to presence of the activity indication from the activity level circuitry and absence of activity indications from each other node to increase the value held by the node pendency counter by an amount at least equal to the predetermined value. In this case, the absence of activity indications from each other node indicates that no other node has a message for ingress onto the ring interconnect. Accordingly, the value held by the node pendency counter can be increased by an amount at least equal to the predetermined value, thereby ensuring that a message from the message buffer will be ingressed onto the ring interconnect, since no other messages are to be ingressed by other nodes of the ring interconnect and thus there will be bandwidth on the ring interconnect for a message to be ingressed onto the ring interconnect.

In some example configurations the node pendency counter is responsive to presence of the activity indication from the activity level circuitry and presence of an activity indication from another node of the plurality of nodes to increase the value held by the node pendency counter by an amount less than the predetermined value. In contrast to the case above where there is an absence of activity indications from each other node, in this case an activity indication from another node indicates that at least one other node in the ring interconnect has a message for ingress onto the ring interconnect. Accordingly, in this case the increase in the value held by the node pendency counter is less than the predetermined amount, such that a message is not always ingressed from the message buffer onto the ring interconnect.

In some example configurations the node pendency counter is responsive to absence of the activity indication from the activity level circuitry and presence of an activity indication from another node of the plurality of nodes to increase the value held by the node pendency counter by an amount less than the predetermined value. In this case, the absence of the activity indication from the activity level circuitry indicates that the node does not have a message for ingress onto the ring interconnect whilst the presence of an activity indication from another node indicates that at least one other node has a message for ingress onto the ring interconnect. The node pendency counter is then responsive to increase the value held by the node pendency counter by an amount less than the predetermined value. In effect, the node pendency counter is able to accrue credit when it does not have a message to send, since it is not intending to use any of the capacity or bandwidth of the ring interconnect. This means that the value held by the node pendency counter is higher when an activity indication is received from the activity level circuitry, and therefore once a message is ready to be ingressed from the message buffer onto the ring interconnect it is more likely to do so.

In some example configurations the node pendency counter is responsive to a signal from the arbitrator circuitry indicating that the message has been added from message buffer onto the ring interconnect to decrease the value held by the node pendency counter. This effectively resets the value held by the node pendency counter to prevent further messages from being ingressed onto the ring interconnect until the value held by the node pendency counter increases to or above the predetermined value again. This ensure that messages are not continually ingressed into the ring interconnect unless it is determined by the arbitrator circuitry that there is bandwidth available to do so.

In some example configurations the arbitrator circuitry is arranged to provide a value increase for the node pendency counter based on a number of activity indications received relative to a bandwidth of the ring interconnect. This means that the value increase for the node pendency counter accounts for the number of nodes that have messages for ingress onto the ring interconnect relative to the bandwidth, or capacity, of the ring interconnect. For example, if the number of activity indications received (in other words, the number of nodes with messages for ingress onto the ring interconnect) is greater than the bandwidth of the ring interconnect, the value increase for the node pendency counter provided by the arbitrator circuitry is adjusted such that the bandwidth of the ring interconnect is not exceeded whilst also ensuring that each node has a fair allocation of the bandwidth of the ring interconnect.

In some example configurations the arbitrator circuitry comprises look-up table circuitry to receive the activity indications from each other node and from the activity level circuitry, and to provide the value increase for the node pendency counter. The look-up table comprises a table of values for the value increase based on the number of activity indications received and the bandwidth of the ring interconnect. In other words, the value increase provided to the node pendency counter is dependent on the number of activity indications received and the bandwidth of the ring interconnect. When there are multiple activity indications received (corresponding to multiple nodes with messages for ingress onto the ring interconnect), the value increase provided to the node pendency counter will be smaller than when no activity indications from other nodes are received. This results in the rate at which the arbitrator circuitry allows messages to be ingressed onto the ring interconnect being proportional to the number of nodes with messages for ingress onto the ring interconnect, allowing each node to ingress messages at a rate which gives each node a fair allocation of the bandwidth of the ring interconnect.

In some example configurations the value increase for the node pendency counter is based, at least in part, on a destination of the message to be added from the message buffer onto the ring interconnect. A message with a destination node only one hop or step around the ring interconnect will remain on the ring interconnect for fewer transmission cycles than a message with a destination node further around the ring interconnect. Accordingly, the value increase for the node pendency counter can account for the number of transmission cycles that a message will be on the ring interconnect.

In some example configurations the activity level circuitry comprises a message pendency counter responsive to the message buffer occupancy to increase a value held by the message pendency counter, wherein the activity level circuitry is responsive to the value held by the message pendency counter being equal to or above a threshold to transmit the activity indication. In a similar manner to the node pendency counter, an activity indication is only transmitted once the value held by the message pendency counter increases to, or increases above, the threshold. This adjusts the rate at which the activity indications are sent, since an activity indication is only send once the value held by the message pendency counter is equal to or above the threshold.

In some example configurations the message pendency counter is responsive to the message buffer receiving a message from a device associated with the node to increase the value held by the message pendency counter. In other words, each time a message is received and buffered, the value held by the message pendency counter is increased, thereby ensuring that an activity indication will be transmitted once a certain number of messages have been received and buffered.

In some example configurations the message pendency counter is arranged to increase the value held by the message pendency counter at a ring interconnect transmission frequency when the number of the messages in the message buffer is above zero. In other words, the value held by the message pendency counter will be increased every transmission cycle until there are no messages in the message buffer. This ensures that an activity indication will eventually be transmitted if there is only a single message in the message buffer, since the presence of this message will cause the value held by the message pendency counter to increase each transmission cycle.

In some example configurations the message pendency counter is responsive to a signal from the activity level circuitry indicating that the activity indication has been transmitted to decrease the value held by the message pendency counter. In a similar manner to the node pendency counter, this effectively resets the value held by the message pendency counter to prevent further activity indications from being retransmitted until the value held by the message pendency counter increases to or above the threshold again. This ensures that activity indications are not continually transmitted unless it is determined by the activity level circuitry that message buffer occupancy is sufficient to do so.

In some example configurations each of the nodes comprises: an acceptance buffer to buffer messages received from the ring interconnect when the node is a message target of the messages; and acceptance buffer monitoring circuitry to transmit a busy signal, when a number of the messages in the acceptance buffer is equal to or above a capacity threshold, to each other node of the plurality of nodes. This reduces the likelihood of messages needing to be "respun" on the ring interconnect, i.e. it is not removed from the ring interconnect at the target node, and is instead transmitted beyond the target node and the entire way around the ring interconnect, to then reach the target node again. Since the rate of ingress of messages onto the ring interconnect can be adjusted in response to a busy signal, the bandwidth utilisation of the ring interconnect is reduced, thereby reducing the rate at which messages are sent to the target node. This gives the target node an opportunity to clear the backlog of messages in its acceptance buffer, reducing the risk of the target node having to reject a message and causing it to be respun.

In some example configurations each pair of nodes is connected by a second inter-node path for that pair of nodes distinct from the ring interconnect, and the busy signal is transmitted via the second inter-node path. In the same manner as the inter-node path for the activity indications, this means that transmission of busy signals does not use any bandwidth on the ring interconnect whilst also ensuring that the busy signals can be transmitted as soon as they are generated since the transmission of busy signals is separate from both the ring interconnect and the transmission of activity indications.

In some example configurations the acceptance buffer monitoring circuitry is arranged to repeat transmission of the busy signal at a ring interconnect transmission frequency, when the number of the messages in the acceptance message buffer is equal to or above the capacity threshold. In a similar manner to the repeat transmission of activity indications, this means that a busy signal will be transmitted until the number of messages in the acceptance buffer is less than the capacity threshold. In other words, a busy signal will be transmitted until there is capacity in the acceptance buffer for additional messages. The ingress rate of messages onto the ring interconnect can then be adjusted and maintained at the adjusted rate until no more busy signals are received, in which cause the ingress rate of message onto the ring interconnect can be increased again.

In some example configurations each of the nodes comprises: an acceptance buffer to buffer messages received from the ring interconnect when the node is a message target of the messages; and acceptance buffer monitoring circuitry to transmit a busy signal, when a number of the messages in the acceptance buffer is equal to or above a capacity threshold, to each other node of the plurality of nodes, wherein the value increase for the node pendency counter is based, at least in part, on reception of a busy signal from another node. As described above, this allows the ingress rate of messages onto the ring interconnect to be adjusted in response to reception of a busy signal. For example, the value increase for the node pendency counter can be reduced in response to receiving a busy signal, thereby reducing the rate at which messages are ingressed onto the ring interconnect. This reduces the bandwidth utilisation of the ring interconnect, reducing the rate at which messages are received at the target node from which the busy signal was transmitted. This allows the target node to reduce the number of messages in the acceptance buffer, thus preventing the likelihood of a message being respun.

In some example configurations the ring interconnect system is a system-on-chip ring interconnect system.

In another example configuration there is provided a method of operating a node of a ring interconnect comprising a plurality of nodes, each node connected to two other nodes to form the ring interconnect, the method comprising: buffering messages received from at least one device associated with the node; generating an activity indication, when a number of the buffered messages is equal to or above a threshold, for transmission to each other node of the plurality of nodes, wherein every pair of nodes is connected by an inter-node path for that pair of nodes separate from the ring interconnect, and the activity indication is transmitted along the respective inter-node paths; receiving the activity indications from each other node and the activity indication generated within the node; and allowing ingress of a buffered message onto the ring interconnect in dependence on the activity indications.

In another example configuration there is provided a ring interconnect system comprising a plurality of nodes, each node connected to two other nodes to form a ring interconnect, wherein every pair of nodes is connected by an inter-node path for that pair of nodes distinct from the ring interconnect, each of the nodes comprising: means for buffering received messages from at least one device associated with the node; means for transmitting an activity indication, when a number of the buffered messages is equal to or above a threshold, to each other node of the plurality of nodes along the respective inter-node paths; means for receiving the activity indications from each other node and the activity indication from the means for transmitting, and means for allowing ingress of a message from the buffer onto the ring interconnect in dependence on the activity indications.

Particular embodiments will now be described with reference to the figures.

Figure 1:
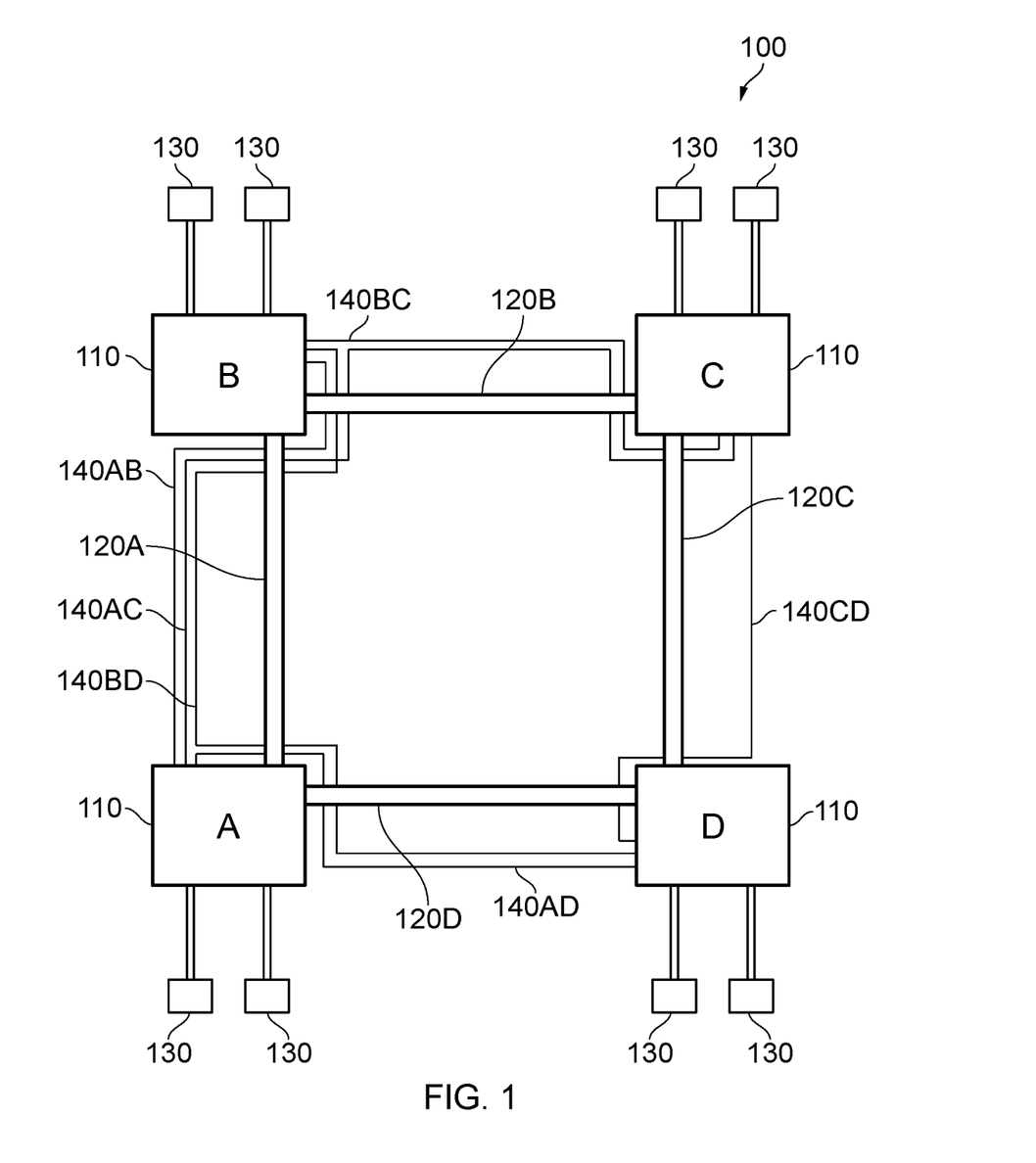
FIG. 1 schematically illustrates a ring interconnect system according to one example configuration.

FIG. 1 schematically illustrates a ring interconnect system 100 according to one example configuration, for example for use as a system-on-chip ring interconnect system. The ring interconnect comprises a plurality of nodes 110. Although FIG. 1 illustrates a ring interconnect comprising 4 nodes (A, B, C, and D), it will be appreciated that fewer nodes, for example 3, and more nodes, for example 8 or 20, are also possible. Each of the nodes 110 is connected, for example by one or more wires, to two other nodes to form a ring interconnect 120. The portion of the ring interconnect 120 between a pair of nodes is referred to herein as a channel. Each channel 120A, 120B, 120C, 120D is used to transfer certain types of message between the nodes of the ring interconnect system 100. Messages are transferred on the ring interconnect 120 in a single direction, for example clockwise or anticlockwise. Accordingly, each node 110 of the ring interconnect system 100 has an upstream channel from which the node 110 receives messages on the ring interconnect 120, and a downstream channel on which the node 110 transmits messages on the ring interconnect 120. For example, if messages are transmitted along the ring interconnect in an clockwise direction, node A in FIG. 1 will receive messages along the upstream channel 120D from node D and transmit messages along the downstream channel 120A to node B. The rate at which messages are received and transmitted at each node 110 of the ring interconnect system 100 is referred to herein as the ring interconnect transmission frequency. Each node 100 of the ring interconnect system 100 is configured to have the same transmission frequency such that each node 100 can transmit a single message during a transmission period of the ring interconnect 120. This ensures smooth operation of the ring interconnect 120 such that messages will travel around the ring interconnect 120 at the same rate (or frequency).

Each node 110 also has at least one device 130 associated with the node 110. These devices 130 are configured to send messages to their associated node 110 for ingress onto the ring interconnect 120. Each message sent on the ring interconnect has a target node corresponding to the intended destination for the message. Further, the message may have a target device, which is one of the devices associated with the target node. An indication of the target node and/or target device may be transmitted as part of the message, such that when the message reaches the target node, the target node is able to determine that it corresponds to the intended destination of the message. The target node then removes the message from the ring interconnect and optionally transmits the message to a target device.

To enable a free-flowing and efficient implementation of the ring interconnect 120, messages already present on the ring interconnect 120 take priority over messages entering the ring interconnect 120. In other words, at each node 110 of the ring interconnect system 100, messages received from the upstream channel of the ring interconnect 120 will take priority over messages received from a device 130 associated with the node 110 for ingress onto the ring interconnect 120. This means that messages on the ring cannot be halted and prevents back pressure on the upstream node, but also means that it would be possible for messages received from a device 130 associated with a given node 110 to be prevented from ever being ingressed onto the ring interconnect 120 if the ring interconnect remains sufficiently busy.

To avoid this, every pair of nodes 110 in the ring interconnect system is connected by an inter-node path 140 for that pair of nodes. As illustrated in FIG. 1, this means that each node is connected to each other node by a dedicated inter-node path 140, so node A and node B are connected by inter-node path 140AB, node A and node C are connected by inter-node path 140AC, node A and node D are connected by inter-node path 140AD and so on. The inter-node paths 140 are distinct from the ring interconnect 120, such that signals transmitted on the inter-node paths 140 are separate from messages transmitted on the ring interconnect 120. In the example illustrated in FIG. 1, each inter-node path 140 comprises a single wire, however in other examples each inter-node path 140 may comprise more than a single wire, for example a pair of wires to allow signals to be transmitted in each direction along a respective dedicated wire. Although the inter-node paths 140 are illustrated in FIG. 1 as conforming to the topology of the ring interconnect 120, this is not essential. In other words, the inter-node paths 140 do not have to follow the topology of the ring interconnect 120. Providing inter-node paths 140 which conform to the topology of the ring interconnect 120, however, makes scaling of the ring interconnect system 100 easier as there are fewer wires and therefore wire crossings required whilst the Manhattan distance remains the same.

As will be described in more detail below, the inter-node paths 140 allow the nodes 110 of the ring interconnect system 100 to transmit signals to allow the nodes 110 to cooperatively determine when each node 110 can ingress messages received from its associated devices 130 onto the ring interconnect 120 whilst also ensuring that priority is given to messages already present on the ring interconnect 120.

Figure 2:
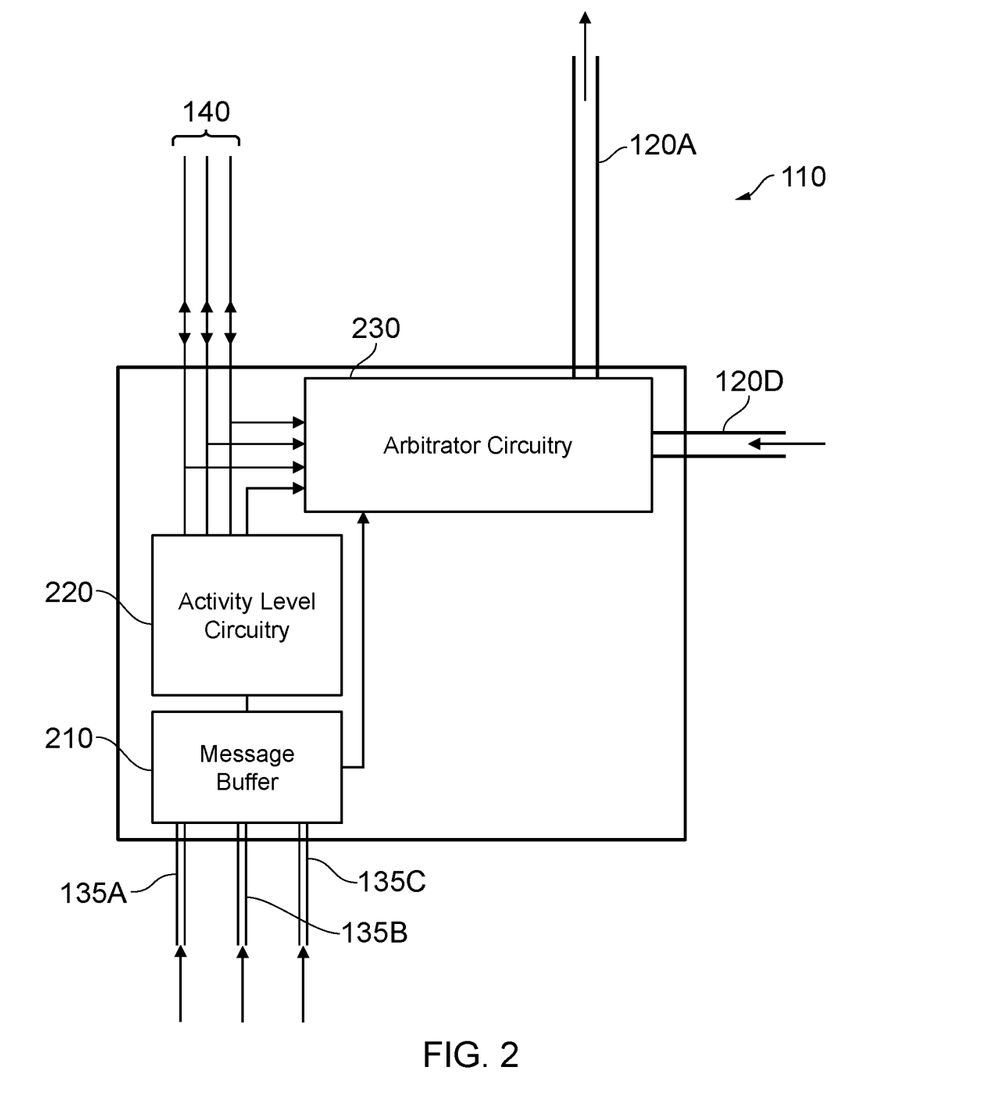
FIG. 2 schematically illustrates a node of a ring interconnect system according to one example configuration.

FIG. 2 schematically illustrates a node 110 of a ring interconnect system, such as node A the ring interconnect system 100 illustrated in FIG. 1, according to one example configuration. The node 110 comprises a message buffer 210 to buffer messages received from at least one device 130 associated with the node 110. The message buffer may be a FIFO (first in, first out) buffer, a LIFO (last in, first out) buffer, or any other appropriate type of buffer. In the example illustrated in FIG. 2 there are three devices 130 associated with the node, each with an individual channel 135A, 135B, 135C for sending messages to the node. It will be appreciated that fewer or more devices 130 may be associated with each node 110 of the ring interconnect system 100. For example, one node of the ring interconnect system may have one device associated with it whilst another node of the ring interconnect system may have 5, 10 or more devices associated with it. Messages intended for ingress onto the ring interconnect 120 are received from devices 130 associated with the node 110 and buffered in the message buffer 210 until it is determined that they can be ingressed onto the ring interconnect 120.

The node 110 illustrated in FIG. 2 also comprises activity level circuitry 220. The activity level circuitry 220 transmits an activity indication in dependence on message buffer occupancy. In other words, the activity level circuitry 220 transmits an activity indication based on the occupancy of the message buffer 210. This is explained in more detail below with reference to FIG. 3. As illustrated in FIG. 2, the activity level circuitry 220 is connected to the inter-node paths 140. This enables the activity level circuitry 220 to transmit the activity indication to each other node of the plurality of nodes via the respective inter-node paths 140. Each activity indication may comprise a signal which is transmitted by the activity level circuitry 220 to each other node of the plurality of nodes. Alternatively, the activity indication may be transmitted from a first node to a second node via a third node. In this case, the same inter-node path 140 is used to transmit the activity indication from the first node to the third node and from the third node to the second node, but the activity indication itself may comprise a first signal from the first node to the third node and a second, different signal, from the third node to the second node.

The node 110 illustrated in FIG. 2 also comprises arbitrator circuitry 230. The arbitrator circuitry 230 receives the activity indications from each other node of the ring interconnect system 100. As described above in relation to the node illustrated in FIG. 2, each other node 110 of the ring interconnect system 100 also has activity level circuitry 220 to transmit an activity indication, in dependence on its respective message buffer occupancy, to the other nodes 110 in the ring interconnect system 100 via the inter-node paths 140. Accordingly, at each node 110, the activity indications from each of the other nodes 110 of the ring interconnect system 100 are received by the arbitrator circuitry 230 via the inter-node paths 140. As illustrated in FIG. 2, the arbitrator circuitry 230 also receives the activity indications from the activity level circuitry 220. In other words, the arbitrator circuitry 230 for a given node 110 receives activity indications from the activity level circuitry 220 of each other node 110 in the ring interconnect system via the inter-node paths 140 and also activity indications from the activity level circuitry 220 within the given node itself.

As illustrated in FIG. 2, the arbitrator circuitry 230 is connected to the ring interconnect 120. Accordingly, messages transmitted around the ring interconnect are received by the arbitrator circuitry 230 via the upstream channel 120D and transmitted by the arbitrator circuitry via the downstream channel 120A. The arbitrator circuitry 230 allows ingress of a message from the message buffer 210 onto the ring interconnect 120 in dependence on the activity indications. Since activity indications are received from each of the other nodes 110 of the ring interconnect system 100, the arbitrator circuitry 230 is aware of the future ring interconnect usage intention of each of the other nodes 110 of the ring interconnect system, and therefore when messages will be received from the upstream channel 120D of the ring interconnect 120. The activity level circuitry 230 also receives activity indications from the activity level circuitry 220 in the same node as the arbitrator level circuitry 230, so the arbitrator circuitry 230 is aware of when there is a message in the message buffer 210 for transmission. This allows the arbitrator circuitry 230 to determine when to allow ingress of the message from the message buffer 210 onto the ring interconnect 120.

This role of the arbitrator circuitry 230 is explained in more detail with reference to FIG. 3, which schematically illustrates further features of the node 110 of the ring interconnect system 100 illustrated in FIG. 2. The arbitrator circuitry 230 of the node 110 illustrated in FIG. 3 comprises a node pendency counter 234. The node pendency counter 234 is responsive to the activity indication from the activity level circuitry 220 to increase a value held by the node pendency counter 234. The arbitrator circuitry 230 is then responsive to the value held by the node pendency counter 234 being equal to or above a predetermined value to allow ingress of the message from the message buffer 210 onto the ring interconnect 120.

The node pendency counter 234 is responsive to presence of the activity indication from the activity level circuitry 220 and absence of activity indications from each other node to increase the value held by the node pendency counter 234 by an amount at least equal to the predetermined value. In other words, the absence of activity indications from each of the other nodes indicates that none of the other nodes intend to ingress a message onto the ring interconnect 120, whilst the activity indications from the activity level circuitry 220 indicates that there is a message in the message buffer 210 of the node 110 for ingress onto the ring interconnect 120. Accordingly, the value held by the node pendency counter 234 is increased by an amount at least equal to the predetermined value such that the arbitrator circuitry 230 will immediately allow ingress of the message from the message buffer 210 onto the ring interconnect 120. Alternatively, or in addition, the node pendency counter 234 is responsive to presence of the activity indication from the activity level circuitry 220 and presence of an activity indication from another node of the plurality of nodes to increase the value held by the node pendency counter 234 by an amount less than the predetermined value. In other words, since an activity indication is received from another node of the ring interconnect system 100, another node of the ring interconnect system 100 has a message waiting to be ingressed onto the ring interconnect 120. It therefore cannot be guaranteed that there is capacity on the ring interconnect 120 for arbitrator circuitry 230 to allow ingress of a message onto the ring interconnect immediately. Accordingly, the value held by the node pendency counter 234 is increased by an amount less than the predetermined value, such that the arbitrator circuitry 230 will allow ingress of the message from the message buffer 210 onto the ring interconnect 120 only if the increase causes the value held by the node pendency counter 234 to rise to or above the predetermined value.

The node pendency counter 234 is responsive to absence of the activity indication from the activity level circuitry 220 and presence of an activity indication from another node of the plurality of nodes to increase the value held by the node pendency counter 234 by an amount less than the predetermined value. In other words, if an activity indication is received from one or more other nodes of the ring interconnect system 100 but no activity indication is received from the activity level circuitry 220, the node pendency counter 234 still increases the value held by the node pendency counter 234. Although in this case the absence of an activity indication from the activity level circuitry 220 means that there is no message in the message buffer 210 ready for ingress onto the ring interconnect, the absence of an activity indication from the activity level circuitry 220 also means that the node does not intend to use any of the capacity or bandwidth of the ring interconnect 120. Accordingly, by increasing the value held by the node pendency counter 234 by an amount less than the predetermined value in this case, the node is effectively able to accrue credit for not using the ring interconnect. This then increases the likelihood that the value held by the node pendency counter 234 will be at least equal to the predetermined value when an activity indication is received from the activity level circuitry 220, and therefore that a message will be allowed to ingress from the message buffer 210 onto the ring interconnect 120 regardless of the number of activity indications received from other nodes of the ring interconnect system 100. The increase in the value held by the node pendency counter 234 in this case may be small, for example a single unit or less than the increase in the value when activity indications are received from the activity level circuitry 220 and at least one other node of the ring interconnect system 100.

Alternatively, if an activity indication is received from one or more other nodes of the ring interconnect system 100 but no activity indication is received from the activity level circuitry 220, the node pendency counter 234 may not change the value held by the node pendency counter 234, or the node pendency counter 234 may reduce the value held by the node pendency counter 234. In the latter case, the value held by the node pendency counter 234 will eventually reach zero unless an activity indication is received from the activity level circuitry 220.

The value increase for the node pendency counter 234 can be related to the number of activity indications received from other nodes in the ring interconnect system 100, for example inversely proportional to the number of activity indications received. The value increase for the node pendency counter may also be related to the predetermined value. For example, if two activity indications are received from other nodes and the predetermined value is 12, the increase for the node pendency counter 234 may be 6 (i.e. the predetermined value divided by the number of activity indications received from other nodes). Alternatively, the increase for the node pendency counter 234 may be 4 (i.e. the predetermined value divided by the sum of the number of activity indications received from other nodes and the activity level circuitry 220). Further, in some examples the arbitrator circuitry 230 is arranged to provide a value increase for the node pendency counter 234 based on a number of activity indications received relative to a bandwidth of the ring interconnect 120, for example bandwidth of the ring interconnect 120 divided by the number of activity indications received (the number of activity indications received including both activity indications received from other nodes of the ring interconnect system 100 and the activity level circuitry 220.)

The node pendency counter 234 is also responsive to a signal from the arbitrator circuitry 230 indicating that a message has been added from the message buffer 210 onto the ring interconnect 120 to decrease the value held by the node pendency counter 234. In other words, the value held by the node pendency counter 234 is decreased when a message is ingressed from the message buffer 210 onto the ring interconnect 120. This may result in the value held by the node pendency counter 234 falling below the predetermined value, in which case another message will not be ingressed from the message buffer 210 onto the ring interconnect 120 by the arbitrator circuitry 230 until the value held by the node pendency counter 234 increases back to or above the predetermined value. Equally, the decrease in the value held by the node pendency counter 234 as a result of a message being ingressed from the message buffer 210 onto the ring interconnect 120 may result in the value held by the node pendency counter 234 still being equal to or above the predetermined value. In this case, the arbitrator circuitry 230 is again responsive to the value held by the node pendency counter 234 being equal to or above the predetermined value to allow ingress of the message from the message buffer 210 onto the ring interconnect 120. The arbitrator circuitry 230 then indicates again to the node pendency counter 234 that a message has been added from the message buffer 210 onto the ring interconnect 120, and the node pendency counter decreases the value held by the node pendency counter 234. In other cases, the node pendency counter 234 is responsive to a signal from the arbitrator circuitry 230 indicating that a message has been added from the message buffer 210 onto the ring interconnect 120 to decrease the value held by the node pendency counter 234 to zero.

Figure 3:
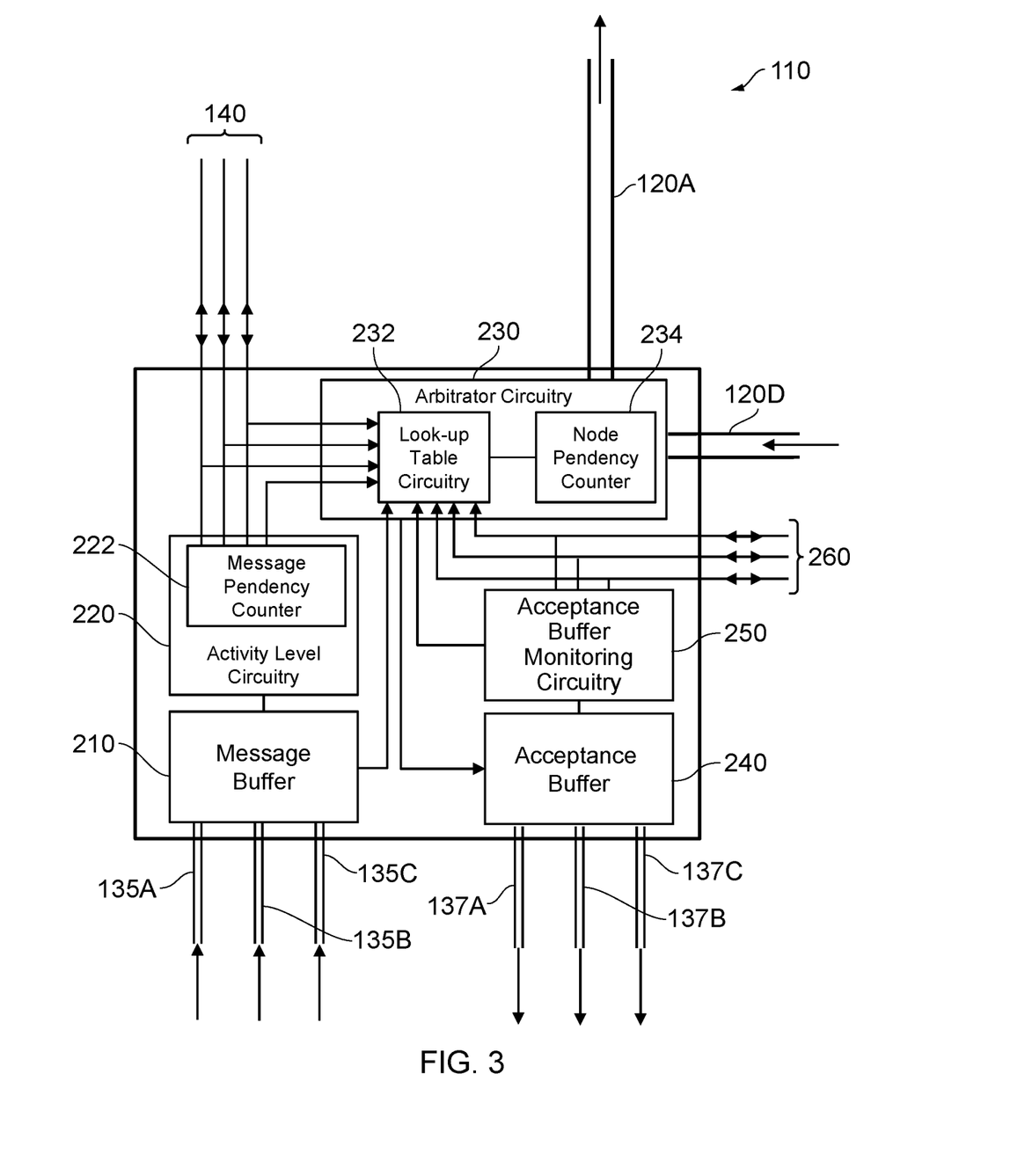
FIG. 3 schematically illustrates further features of a node of a ring interconnect system according to one example configuration.

The arbitrator circuitry 230 illustrated in FIG. 3 also comprises look-up table circuitry 232 to receive the activity indications from each other node and from the activity level circuitry 220. The look-up table circuitry 232 then provides the value increase for the node pendency counter 234. For example, the look-up table circuitry 234 may be in the form of content-addressable memory (CAM), thereby allowing the value increase for the node pendency counter 234 to be provided based on the inputs described above, such as the number of activity indications received from other nodes of the ring interconnect system 100, activity indication received from the activity level circuitry 220, and the bandwidth of the ring interconnect 120. In some examples, the value increase for the node pendency counter 234 is based, at least in part, on a destination of the message to be added from the message buffer 210 onto the ring interconnect 120. This allows the value increase for the node pendency counter 234 to account for independent routes around the ring interconnect 120. For example, in the ring interconnect system 100 illustrated in FIG. 1, a message at node A with node B as the target node can be transmitted independently of a message at node C with node D as the target node, since neither message needs to traverse the same node in order to reach their respective target nodes, and thus transmission of one message does not deprive the other message of any of the bandwidth of the ring interconnect 120.

As illustrated in FIG. 3, the activity level circuitry 220 comprises a message pendency counter 222. The message pendency counter 222 operates in a similar fashion to the node pendency counter 234, in that the message pendency counter 222 is responsive to the message buffer occupancy to increase a value held by the message pendency counter 222. The activity level circuitry 220 is then responsive to the value held by the message pendency counter 222 being equal to or above a threshold to transmit the activity indication. As described below, the message buffer occupancy can be based on the number of messages in the message buffer 210, the duration that a message has been in the message buffer 210, or a combination thereof.

The message pendency counter 222 is responsive to the message buffer 210 receiving a message from a device 130 associated with the node 110 to increase the value held by the message pendency counter 222. In other words, the value held by the message pendency counter 222 will increase each time a message is received in the message buffer, such that once a predetermined number of messages have been received from the devices 130 associated with the node 110, an activity indication will be transmitted by the activity level circuitry 220. For example, the predetermined number of messages may be a single message. In this case, the increase in the value held by the message pendency counter 222 will be equal to or greater than the threshold, such that the activity level circuitry 220 transmits an activity indication whenever a message is received at the message buffer 210 from a device 130 associated with node 110. Alternatively the predetermined number of messages may be higher, for example 5, 10 or 20 messages, such that the increase in the value held by the message pendency counter 222 is equal to the threshold divided by the predetermined number of messages.

The message pendency counter 222 can also be arranged to increase the value held by the message pendency counter 222 at a ring interconnect transmission frequency when the number of the messages in the message buffer 210 is above zero. In other words, an activity indication will be transmitted by the activity level circuitry 220 once a message has been in the message buffer for a predetermined number of transmission cycles. This ensures that if there is a single message in the message buffer 210, an activity indication will eventually be transmitted.

The increase in the value held by the message pendency counter 222 due to a message being received at the message buffer 210 from a device 130 associated with the node 110 may be the same as or different to the increase in the value held by the message pendency counter 222 at a ring interconnect transmission frequency when the number of messages in the message buffer 210 is above zero. For example, the activity level circuitry 220 and the message pendency counter 222 may be configured such that an activity indication is transmitted when there are four messages in the message buffer 210, but when there is a single message in the message buffer 210 ten transmission cycles need to elapse before an activity indication.

The message pendency counter 222 is responsive to a signal from the activity level circuitry 220 indicating that the activity indication has been transmitted to decrease the value held by the message pendency counter 222. In other words, the value held by the message pendency counter 222 is decreased when an activity indication is transmitted by the activity level circuitry 220. This may result in the value held by the message pendency counter 222 falling below the threshold, in which case another activity indication will not be transmitted by the activity level circuitry 220 until the value held by the message pendency counter 222 increases back to or above the threshold. Equally, the decrease in the value held by the message pendency counter 222 as a result of an activity indication being transmitted by the activity level circuitry 220 may result in the value held by the message pendency counter 222 still being equal to or above the threshold. In this case, the activity level circuitry 220 is again responsive to the value held by the message pendency counter 222 being equal to or above the threshold value to transmit an activity indication. The activity level 220 then indicates again to the message pendency counter 222 that an activity indication has been transmitted, and the message pendency counter 222 decreases the value held by the message pendency counter 222. In other cases, the message pendency counter 222 is responsive to a signal from the activity level circuitry 220 indicating that an activity indication has been transmitted to decrease the value held by the message pendency counter 222 to zero.

The threshold for determining when an activity signal is to be transmitted by the activity level circuitry 220 is the same at each node 110 of the ring interconnect system 100. In some cases, the threshold is equal to the maximum capacity of the smallest message buffer 210 of a node 110 of the ring interconnect system 100. It will be appreciated that the message buffer 210 at each of the nodes 110 of the ring interconnect system 100 may have a different capacity. For example, the capacity of each message buffer 210 may be related to the number of devices 130 associated with each particular node 110. In some cases, the threshold is dependent on the number of nodes 110 in the ring interconnect system 100. For example, in a ring interconnect system with 4 nodes, the threshold may be a multiple of 4, such as 4, 8 or 12, or may be a relation of the number of nodes, such as 3 (N−1) or 5 (N+1).

The node 110 illustrated in FIG. 3 also comprises an acceptance buffer 240. The acceptance buffer 240 buffers messages received from the ring interconnect 120 when the node 110 is a message target of the messages. The acceptance buffer 240 may be a FIFO buffer, a LIFO buffer, or any other appropriate type of buffer. The acceptance buffer 240 then transmits each message in turn to the appropriate device 130 associated with the node 110, for example the target device for the message. In the example illustrated in FIG. 3 there are three devices 130 associated with the node, each with an individual channel 137A, 137B, 137C for receiving messages from the acceptance buffer 240. It will be appreciated that fewer or more devices 130 may be associated with each node 110 of the ring interconnect system 100. Equally, although it is illustrated in FIG. 3 that the channels 137A, 137B, 137C for receiving messages from the acceptance buffer 240 are separate from the channels 135A, 135B, 135C for sending messages to the message buffer 120, each device 130 associated with the node 110 may only be linked by a single channel used for transmitting messages from the device 130 to the message buffer 210 and for transmitting messages from the acceptance buffer 240 to the device.

The node 110 also comprises acceptance buffer monitoring circuitry 250. In a similar fashion to the activity level circuitry 220 with the message buffer 210, the acceptance buffer monitoring circuitry 250 monitors the number of messages in the acceptance buffer 240. The acceptance buffer monitoring circuitry 250 transmits a busy signal, when a number of the messages in the acceptance buffer 240 is equal to or above a capacity threshold, to each other node of the plurality of nodes. In some examples the acceptance buffer monitoring circuitry 250 is arranged to repeat transmission of the busy signal at the ring interconnect transmission frequency, when the number of the messages in the acceptance message buffer 240 is equal to or above the capacity threshold. In other words, the acceptance buffer monitoring circuitry 250 is configured to transmit an busy signal every transmission period of the ring interconnect 120 until the number of messages in the acceptance buffer 240 is less that the capacity threshold. This allows each node 110 to inform each other node of the ring interconnect system 100 when their respective acceptance buffers are at or near capacity. The capacity threshold may correspond to the capacity of the acceptance buffer 240, or it may be less than the capacity of the acceptance buffer 240. For example, if the capacity of the acceptance buffer 240 is 10 messages, the capacity threshold may be 10 messages or it may be less than 10, for example 8 or 5. A capacity threshold less than the capacity of the acceptance buffer 240 allows each node 110 to inform each other node that their respective acceptance buffer 240 is nearing capacity before it fills up entirely, thereby preventing messages from being rejected at the node 110 and being respun around the ring interconnect 120.

In some examples, each pair of nodes is connected by a second inter-node path 260 for that pair of nodes distinct from the ring interconnect 120. The busy signal is then transmitted by the acceptance buffer monitoring circuitry 250 via the second inter-node paths 260 to each of the other nodes in the ring interconnect system 100. In this case, second inter-node paths 260 are also distinct from the first inter-node paths 140. Alternatively, the busy signals may be transmitted by the acceptance buffer monitoring circuitry 250 via the first inter-node paths 120, either separately from the activity indications or combined with the activity indications into a single transmission. In the example illustrated in FIG. 3, each second inter-node path 260 comprises a single wire, however in other examples each second inter-node path 240 may comprise more than a single wire, for example a pair of wires, to allow signals to be transmitted in each direction along a respective dedicated wire.

The arbitrator circuitry 230 receives any busy signal transmitted by another node of the ring interconnect system 100, for example via the second inter-node paths 260. The value increase for the node pendency counter 234 provided by the arbitrator circuitry 230 is then based, at least in part, on reception of a busy signal from another node of the ring interconnect system 100. As illustrated in FIG. 3, the busy signals are received by the look-up table circuitry 232 of the arbitrator circuitry 230. The value increase provided by the look-up table circuitry 232 for the node pendency counter 234 is then based, at least in part, on reception of a busy signal from another node of the ring interconnect system 100, for example via the second inter-node paths 260.

Additionally, the value increase for the node pendency counter 234 can be based, at least in part, on the destination of the message to be added from the message buffer 210 onto the ring interconnect 120. In particular, the look-up table circuitry 232 may be configured to reduce the value increase for the node pendency counter 234 if a busy signal has been received from the node corresponding to the destination of the message to be added from the message buffer 210 onto the ring interconnect 120. This then only reduces the rate at which messages are ingressed onto the ring interconnect 120 for messages with a destination corresponding to a node where the acceptance buffer 240 is equal to or above the capacity threshold. Accordingly, the busy node is able to reduce the number of messages in its acceptance buffer without the entire bandwidth of the ring interconnect being reduced unnecessarily.

Figure 4:
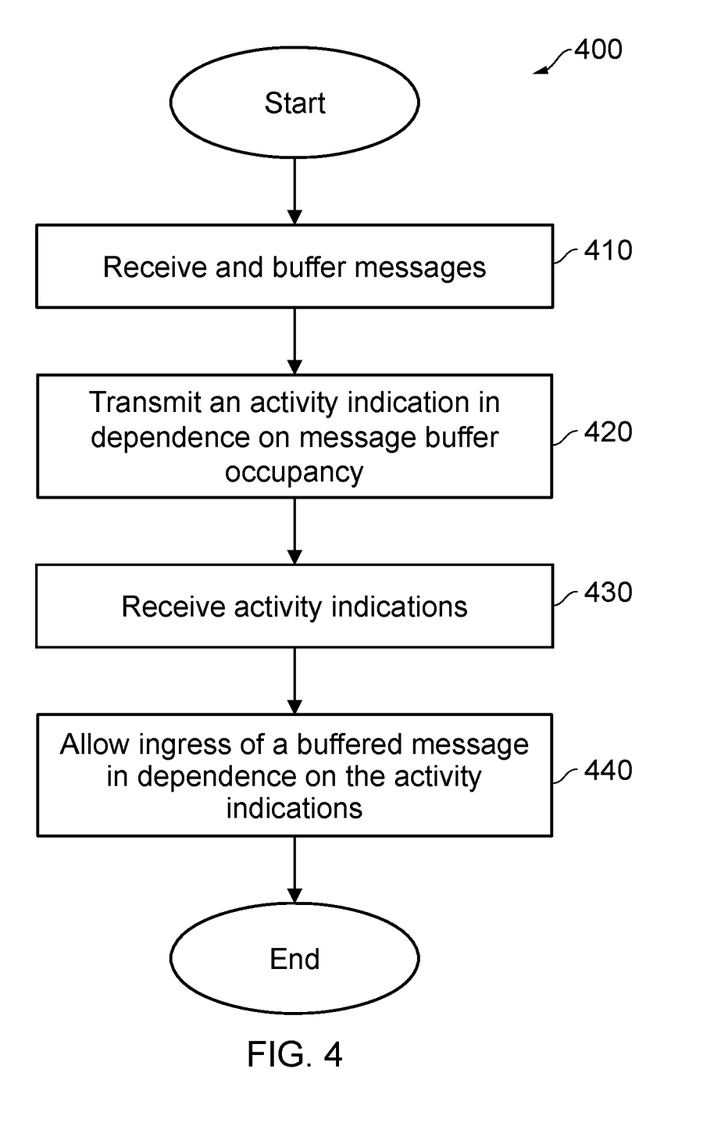
FIG. 4 illustrates a flow diagram of a method of operating a node of a ring interconnect.

FIG. 4 illustrates a flow diagram of a method 400 of operating a node of a ring interconnect, for example the node 110 illustrated in FIG. 2. The method begins substantially at step 410, where messages received from at least one device associated with the node are buffered. At step 420, an activity indication is generated for transmission to each other node of the plurality of nodes in the ring interconnect system via the inter-node paths in dependence on the message buffer occupancy. At step 430 the activity indications from each other node and the activity indication generated within the node are received, and at step 440 ingress of a buffered message is allowed onto the ring interconnect in dependence on the activity indications.

Figure 5:
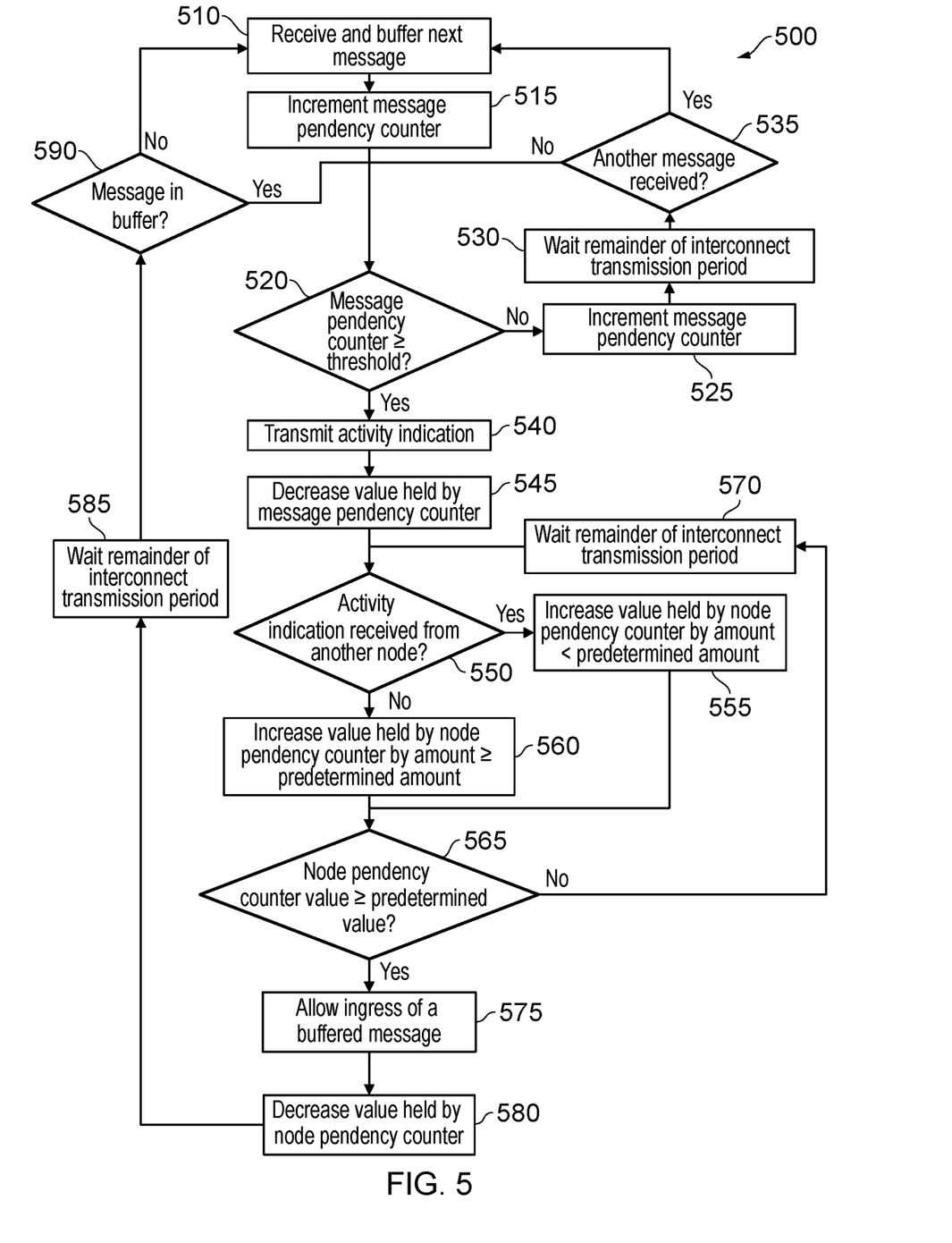
FIG. 5 illustrates a flow diagram of a further method of operating a node of a ring interconnect.

FIG. 5 illustrates a flow diagram of a further method 500 of operating a node of a ring interconnect, for example the node 110 illustrated in FIG. 3. At step 510 the next message is received from a device associated with the node and the message is buffered. At step 515 the message pendency counter is incremented. At step 520 it is determined whether the value held by the message pendency counter is equal to or above a threshold. If it is determined that the value held by the message pendency counter is less than the threshold, the method continues to step 525, where the message pendency counter is incremented. The method then continues to step 530, where the remainder of the interconnect transmission period is allowed to elapse. The method then continues to step 535, where it is determined whether another message has been received from a device associated with the node. If it is determined that another message has been received, the method returns to step 510 for the next message from a device associated with the node to be received and buffered. If it is determined at step 535 that another message has not been received, the method returns to step 520, where it is determined again whether the value held by the message pendency counter is equal to or above a threshold. If it is determined at step 520 that the value held by the message pendency counter is equal to or above the threshold, the method continues to step 540, where an activity indication is generated and transmitted to each other node of the plurality of nodes in the ring interconnect system via the inter-node paths. The method then continues to step 545, where the value held by the message pendency counter is decreased, then at step 550 it is determined whether an activity indication has been received from another node. If it is determined that an activity indication has been received from another node, the method continues to step 555, where the value held by the node pendency counter is increased by a value less than a predetermined amount. As described above, if no activity indication is received from the activity level circuitry within the node, but an activity level signal has been received from another node, the value held by the node pendency counter is increased by a value less than a predetermined amount. This increase may be less than the increase described at step 555 above. The method then continues to step 565. If at step 550 is it determined that an activity indication has not been received from another node, the method continues to step 560, where the value held by the node pendency counter is increased by a value greater than or equal to the predetermined amount. The method then continues to step 565. At step 565, it is determined whether the value held by the node pendency counter is greater than the predetermined value. If the value held by the node pendency counter is less than the predetermined value the method continues to step 570, where the remainder of the interconnect transmission period is allowed to elapse. The method then continues back to step 550, where it is determined whether an activity indication has been received from another node. If at step 565 it is determined that the value held by the node pendency counter is greater than the predetermined value the method continues to step 575, where a buffered message is allowed to ingress onto the ring interconnect. The method then continues to step 580, where the value held by the node pendency counter is decreased. The method then continues to step 585, where the remainder of the interconnect transmission period is allowed to elapse. At step 590 it is determined whether there are any messages in the message buffer. If it is determined that there is at least one message in the message buffer, the method returns to step 520 where it is determined again whether the value held by the message pendency counter is equal to or above a threshold. If at step 590 it is determined that there are no messages in the message buffer, the method returns to step 510, where the next message is received from a device associated with the node and the message is buffered. The method illustrated in FIG. 5 therefore is a closed method for operating a node of a ring interconnect to ensure that each message received from a device associated with node is ingressed onto the ring interconnect at an appropriate moment.

Figure 6:
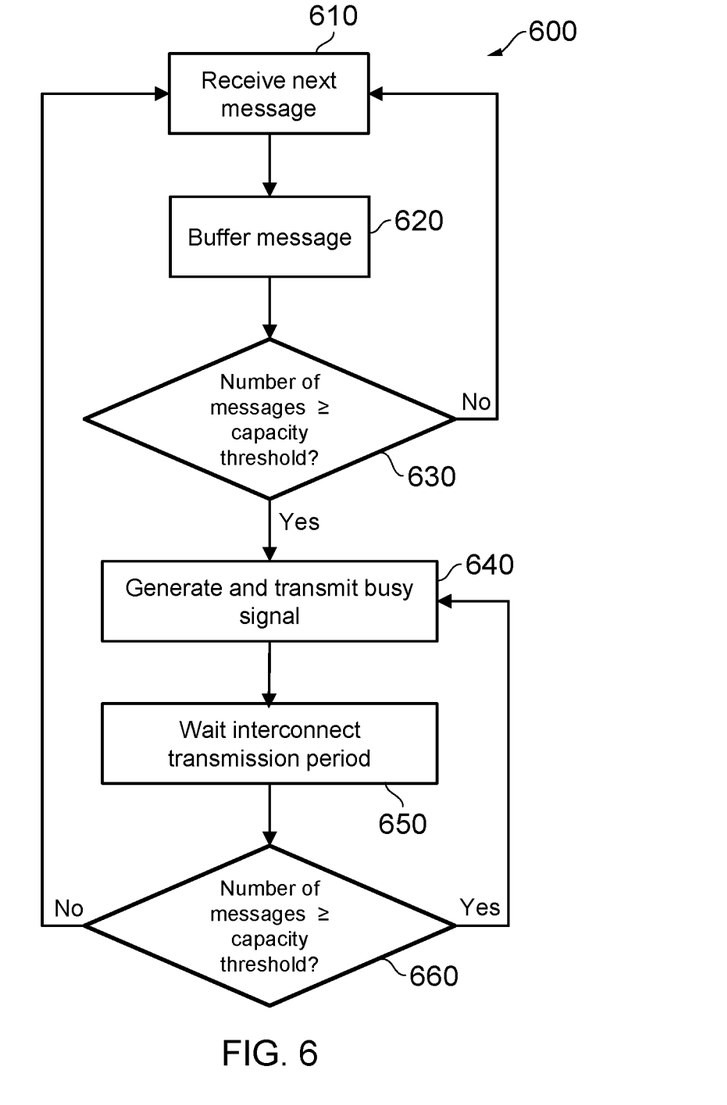
FIG. 6 illustrates a flow diagram of a further method of operating a node of a ring interconnect.

FIG. 6 illustrates a flow diagram of a further method 600 of operating a node of a ring interconnect, for example the node 110 illustrated in FIG. 3. At step 610 a message is received from the ring interconnect by a node, where the node is the message target of the message, and at step 620 the message is buffered. At step 630 it is determined whether the number of buffered messages is equal to or above a capacity threshold. If it is determined that the number of buffered messages is less than the capacity threshold, the method returns to step 610, for another message to be received from the ring interconnect. If at step 630 it is determined that the number of buffered messages is equal to or above the capacity threshold, the method continues to step 640, where a busy signal is generated and transmitted to the other nodes of the ring interconnect system. At step 650 the remainder of the interconnect transmission period is allowed to elapse, then at step 660 is it determined again whether the number of buffered messages is equal to or above the capacity threshold. If it is determined that the number of buffered messages is equal to or above the capacity threshold, the method returns to step 640, where a busy signal is generated and transmitted to the other nodes of the ring interconnect system. If at step 660 it is determined that the number of buffered messages is less than the capacity threshold, the method returns to step 610, where another message is received from the ring interconnect. The method illustrated in FIG. 6 therefore is a closed method for operating a node of a ring interconnect. The method illustrated in FIG. 6 can be carried out simultaneously with the message of FIG. 5. For example, the busy signals transmitted at step 640 of the method illustrated in FIG. 6 can received with the activity indications at step 550 of the method illustrated in FIG. 5. A busy signal can then be treated in a similar fashion to an activity indication received from another node. In other words, at step 550 it is determined whether an activity indication and/or a busy signal has been received from another node. If a busy signal or an activity indication has been received from another node, the method then continues to step 555 where the value held by the node pendency counter is increased by a value less than a predetermined amount.

Although in the example configurations described herein the ring interconnection is a single ring topology, where messages are transferred on the ring interconnect in a single direction, the ring interconnection may also be a double ring topology. With a double ring topology, the portion of the ring interconnect between a pair of nodes comprises two channels, thereby allowing messages to be transferred between a pair of nodes in both directions. In this case, each node is configured to determine the direction to send each message around the ring interconnect. In some examples, the node determines the shortest path to send each message to its intended destination node, for example by determining the number of nodes that a message will need to transverse in each direction around the ring interconnect to reach the destination node and transmits the node in the direction corresponding to the shortest direction. Alternatively, or in addition, each node comprises separate activity level circuitry and arbitrator circuitry as described above for each direction around the ring interconnect. Each node is then able to allow ingress of a message onto the ring in either direction in dependence on the activity indications in order to optimise the usage of the ring interconnect in each direction. For example, if activity indications are received for the anti-clockwise ring interconnect channel but no activity indications are received for the clockwise ring interconnect channel, the node may allow ingress of a message from the message buffer onto clockwise ring interconnect channel even if the anti-clockwise channel is determined to be the shortest direction. In this case, particularly for a ring interconnect system with a small number of nodes, the message may still reach the destination node quicker than if it were transmitted along the channel corresponding to the shortest direction since the message will be prevented from being ingressed for a number of transmission periods until the value of the node pendency counter is greater or equal to than the predetermined value. Accordingly, the node may be configured to allow ingress of each message onto the ring interconnect system in either direction at the first available opportunity, since messages on the ring interconnect have priority over messages awaiting ingress onto the ring interconnect, so the message is guaranteed to reach the destination node once it is on the ring interconnect.

In brief overall summary, a ring interconnect system comprises a plurality of nodes. Each node is connected to two other nodes to form a ring interconnect. Every pair of nodes is connected by an inter-node path for that pair of nodes distinct from the ring interconnect. Each of the nodes comprises a message buffer to buffer messages received from at least one device associated with the node. Each of the nodes also comprises activity level circuitry to transmit an activity indication, when a number of the messages in the message buffer is equal to or above a threshold, to each other node of the plurality of nodes via the respective inter-node paths. Each of the nodes also comprises arbitrator circuitry to receive the activity indications from each other node and from the activity level circuitry, and to allow ingress of a message from the message buffer onto the ring interconnect in dependence on the activity indications. Also provided is a method of operating a node of a ring interconnect system In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. A ring interconnect system comprising:
 a plurality of nodes, each node connected to two other nodes to form a ring interconnect, wherein every pair of nodes is connected by a dedicated inter-node path for that pair of nodes distinct and spatially separate from the ring interconnect, each of the nodes comprising:
 a message buffer to buffer messages received from at least one device associated with the node;
 activity level circuitry to transmit an activity indication, to each other node of the plurality of nodes via the respective dedicated inter-node paths in dependence on message buffer occupancy; and
 arbitrator circuitry to receive the activity indications from each other node via the dedicated inter-node paths and from the activity level circuitry, and to allow ingress of a message from the message buffer onto the ring interconnect in dependence on the activity indications.

2. The ring interconnect system of claim 1, wherein the arbitrator circuitry comprises a node pendency counter responsive to the activity indication from the activity level circuitry to increase a value held by the node pendency counter, wherein the arbitrator circuitry is responsive to the value held by the node pendency counter being equal to or above a predetermined value to allow ingress of the message from the message buffer onto the ring interconnect.

3. The ring interconnect system of claim 2, wherein the node pendency counter is responsive to presence of the activity indication from the activity level circuitry and absence of activity indications from each other node to increase the value held by the node pendency counter by an amount at least equal to the predetermined value.

4. The ring interconnect system of claim 2, wherein the node pendency counter is responsive to presence of the activity indication from the activity level circuitry and presence of an activity indication from another node of the plurality of nodes to increase the value held by the node pendency counter by an amount less than the predetermined value.

5. The ring interconnect system of claim 2, wherein the node pendency counter is responsive to absence of the activity indication from the activity level circuitry and presence of an activity indication from another node of the plurality of nodes to increase the value held by the node pendency counter by an amount less than the predetermined value.

6. The ring interconnect system of claim 2, wherein the node pendency counter is responsive to a signal from the arbitrator circuitry indicating that the message has been added from the message buffer onto the ring interconnect to decrease the value held by the node pendency counter.

7. The ring interconnect system of claim 2, wherein the arbitrator circuitry is arranged to provide a value increase for the node pendency counter based on a number of activity indications received relative to a bandwidth of the ring interconnect.

8. The ring interconnect system of claim 7, wherein the arbitrator circuitry comprises look-up table circuitry to receive the activity indications from each other node and from the activity level circuitry, and to provide the value increase for the node pendency counter.

9. The ring interconnect system of claim 7, wherein the value increase for the node pendency counter is based, at least in part, on a destination of the message to be added from the message buffer onto the ring interconnect.

10. The ring interconnect system of claim 1, wherein the activity level circuitry comprises a message pendency counter responsive to the message buffer occupancy to increase a value held by the message pendency counter, wherein the activity level circuitry is responsive to the value held by the message pendency counter being equal to or above a threshold to transmit the activity indication.

11. The ring interconnect system of claim 10, wherein the message pendency counter is responsive to the message buffer receiving a message from a device associated with the node to increase the value held by the message pendency counter.

12. The ring interconnect system of claim 10, wherein the message pendency counter is arranged to increase the value held by the message pendency counter at a ring interconnect transmission frequency when the number of the messages in the message buffer is above zero.

13. The ring interconnect system of claim 10, wherein the message pendency counter is responsive to a signal from the activity level circuitry indicating that the activity indication has been transmitted to decrease the value held by the message pendency counter.

14. The ring interconnect of system claim 1, wherein each of the nodes comprises:
an acceptance buffer to buffer messages received from the ring interconnect when the node is a message target of the messages; and
acceptance buffer monitoring circuitry to transmit a busy signal, when a number of the messages in the acceptance buffer is equal to or above a capacity threshold, to each other node of the plurality of nodes.

15. The ring interconnect system of claim 14, wherein each pair of nodes is connected by a second dedicated inter-node path for that pair of nodes distinct and spatially separate from the ring interconnect, and the busy signal is transmitted via the second dedicated inter-node path.

16. The ring interconnect system of claim 14, wherein the acceptance buffer monitoring circuitry is arranged to repeat transmission of the busy signal at a ring interconnect transmission frequency, when the number of the messages in the acceptance message buffer is equal to or above the capacity threshold.

17. The ring interconnect system of claim 7, wherein each of the nodes comprises:
an acceptance buffer to buffer messages received from the ring interconnect when the node is a message target of the messages; and
acceptance buffer monitoring circuitry to transmit a busy signal, when a number of the messages in the acceptance buffer is equal to or above a capacity threshold, to each other node of the plurality of nodes,
wherein the value increase for the node pendency counter is based, at least in part, on reception of a busy signal from another node.

18. The ring interconnect system of claim 1, wherein the ring interconnect system is a system-on-chip ring interconnect system.

19. A method of operating a node of a ring interconnect comprising a plurality of nodes, each node connected to two other nodes to form the ring interconnect, the method comprising:
buffering messages received from at least one device associated with the node;
generating an activity indication for transmission to each other node of the plurality of nodes in dependence on message buffer occupancy, wherein every pair of nodes is connected by a dedicated inter-node path for that pair of nodes distinct and spatially separate from the ring interconnect, and the activity indication is transmitted along the respective dedicated inter-node paths;
receiving the activity indications from each other node via the dedicated inter-node paths and the activity indication generated within the node; and
allowing ingress of a buffered message onto the ring interconnect in dependence on the activity indications.

20. A ring interconnect system comprising:
a plurality of nodes, each node connected to two other nodes to form a ring interconnect, wherein every pair of nodes is connected by a dedicated inter-node path for that pair of nodes distinct and spatially separate from the ring interconnect, each of the nodes comprising:
means for buffering received messages from at least one device associated with the node;

means for transmitting an activity indication to each other node of the plurality of nodes along the respective dedicated inter-node paths in dependence on message buffer occupancy;
means for receiving the activity indications from each other node via the dedicated inter-node paths and the activity indication from the means for transmitting; and
means for allowing ingress of a message from the buffer onto the ring interconnect in dependence on the activity indications.

* * * * *